Sept. 13, 1966    B. E. M. TROBERG    3,272,179
SELF-FITTING TEAT CUP LINER
Filed Sept. 15, 1964
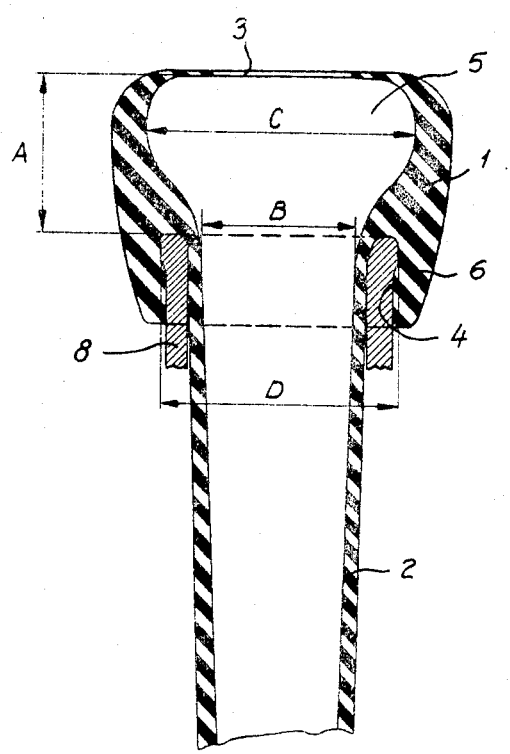
INVENTOR.
Bengt Erik Mikael Troberg
BY
Davis, Hoxie, Faithfull & Hapgood
ATTORNEYS United States Patent Office 3,272,179
Patented Sept. 13, 1966

3,272,179
SELF-FITTING TEAT CUP LINER
Bengt Erik Mikael Troberg, Hamra Gard, Tumba,
Sweden, assignor to Alfa-Laval AB, Stockholm,
Sweden, a corporation of Sweden
Filed Sept. 15, 1964, Ser. No. 396,567
Claims priority, application Sweden, Sept. 26, 1963,
10,541/63
2 Claims. (Cl. 119—14.49)

This invention relates to teat cups for milking machines and more particularly to an improved liner for teat cups.

A teat cup liner consists basically of a top and a tubular body. The top is provided at its upper part with an opening for the insertion of a teat and is generally provided at its lower part with a groove for the insertion of the upper end of a teat cup shell. The tubular body is a prolongation of the inner wall of the top groove and is arranged to be stretched between the ends of the shell.

It has recently been attempted to increase the efficiency of machine milking systems by increasing the vacuum which is used to effect the milking, while avoiding any adverse effect upon the cows due to the increased vacuum. In this connection, the design of the teat cup liner in general and of its top in particular has become of increasing importance.

The teat cup liners hitherto known in the art are not so constructed that they can fulfill the requirements as to efficiency and lack of adverse effect upon the cows when used in connection with an increased vacuum in modern machine milking systems.

Among the most evident drawbacks inherent in teat cup liners in this respect are that the part of the liner top surrounding the opening for the teat is usually convex or concave and that it is neither thin-walled nor resilient. Consequently, there is a great risk that the teat is squeezed by said part during the milking, which hurts the cow and is detrimetnal to the milk yield.

Further, the hollow space in the top of the prior teat cup liners which surrounds the teat is too small, its dimensions are often arbitrarily chosen and the wall surrounding the hollow space has an essentially semi-circular axial section and a comparatively small thickness. Accordingly, the liner top may be compressed both axially and radially. Owing to this undesirable compression of the liner top, the volume of the hollow space becomes so small that the vacuum, which must keep the teat radially expanded in the hollow space so that the milk channel in the teat remains open, cannot be maintained. Consequently, the teat will be squeezed in this area and, furthermore, the wall of the liner top will directly compress a more or less large part of the teat within said area.

Finally, a number of teat cup liners known in the art are provided with a flange stretching around one end of the teat cup shell and which is so thin that it neither reliably prevents the flange from gliding over the edge of the shell nor contributes to supporting and stiffening the liner-top wall near the flange.

The teat cup liner according to the present invention, on the other hand, is so formed in all its parts that it completely eliminates the above-mentioned drawbacks inherent to teat cup liners known in the art and entirely fulfills the requirements as to efficiency and lack of adverse effect upon the cows when used in modern machine milking plants.

In the teat cup liner of the present invention, the top around the hole for the teat is essentially flat, comparatively thin-walled and resilient, and the top surrounds a comparatively large hollow space, the axial dimension of which is at least equal to the largest inner diameter of the tubular body. The largest inner diameter of the hollow space is at least equal to the outer diameter of the groove for the teat cup shell. The side wall surrounding the hollow space is so thick and has such a shape that no appreciable compression of the hollow space to a smaller volume is possible under normal operating stresses.

The teat cup liner according to the invention is further characterized in that a ring-shaped flange with which its top is provided, and which stretches around one end of the teat cup shell, has such a thickness that it prevents the flange from gliding over the edge of the shell when submitted to normal tensile forces from the tubular body stretched in the shell.

Due to such a form of the top of the teat cup liner, the part of the liner top which lies against the udder is at such a distance from the teat that it does not exert any pressure on the wall of the udder in the region nearest the teat root where the udder contains delicate organs which are important for the yield of the milk. The wall of the liner top around the hole for the teat, which wall is essentially flat when no teat has been introduced in the hole, is so thin and resilient that it fits tightly against a teat introduced in it without the passage of the milk through the teat being prevented by any squeezing at the root of the teat.

The top part of the liner surrounds a hollow space around the teat, which space is dimensioned in such way that its volume is sufficient to ensure that the vacuum which prevails in the hollow space during the milking process can be maintained even if some air should leak in through the hole for the teat. Furthermore, the vertical wall surrounding the hollow space is so thick and has such a shape that the hollow space cannot be appreciably squeezed, neither axially nor radially, to a smaller volume under normal operating conditions. Owing to the comparatively large and invariable volume of the hollow space, the vacuum is able to maintain the upper part of the teat radially stretched so that its milk channels are fully open and the part of the liner top which surrounds the hole for the teat, and which is rolled downwards and inwards along the teat when in use, cannot come into contact with nor be influenced by the vertical wall surrounding the hollow space. Consequently, the upper part of the teat will not be squeezed.

Finally, the top of the liner cannot be sucked or drawn into the teat cup shell due to the vacuum and/or the stretching of the tubular part. That is, the liner top is provided with a ring-shaped flange which stretches around the upper end of the teat cup shell and, according to the invention, the thickness of the flange is such that the latter cannot glide over the edge of the shell when submitted to normal tensile stresses from the stretched and vacuum-actuated tubular part. Owing to the fact that the flange which constitutes a direct prolongation of the wall of the liner top outside of the teat cup shell is so thick, it also serves to a great extent to support and stiffen said wall.

For a better understanding of the invention, reference may be had to the accompanying drawing in which the single illustration is a longitudinal sectional view through the top part and part of the appurtenant tubular body of a teat cup liner according to the invention.

In the drawing, reference numeral 1 designates the liner top and 2 its tubular body, these parts being integral and made of rubber or a rubber-like material. The liner top 1 is provided at its upper end with a hole 3 for a teat and at its lower end with an annular groove 4 intended to receive the upper end of a teat cup shell 8. The liner top 1 surrounds a hollow space 5, the length of which is designated by A, its largest diameter being designated by C. The liner top 1 is further provided with a ring-shaped flange 6 which stretches around the upper end of a teat cup shell. The largest inner diameter of the tubular body 2 is designated by B and the outer diameter of the groove 4 by D, the diameter D also corresponding to the outer diameter of shell 8 where it is received in the groove 4.

The outer diameter of top 1 is considerably larger than the outer diameter of shell 8; and the tubular body 2 is arranged in the usual manner to be stretched between the ends of shell 8 when in use. The top 1 around the hole 3 is essentially flat, thin-walled and resilient. The axial dimension A is at least equal to the inner diameter B, and the largest inner diameter C of top 1 is at least equal to the outer diameter D.

I claim:

1. A teat cup liner comprising a top and a tubular body affixed to the top, the top having at its upper end an opening for insertion of a teat and having at its lower part an annular groove for receiving the upper end of a teat cup shell, said top having a substantially cylindrical vertical side wall surrounding a large hollow space located above the level of said groove and having an axial dimension which is at least equal to the largest inner diameter of the tubular body, said tubular body being adapted to be stretched between the ends of said shell, said upper end of the top forming an essentially flat wall defining said opening and which is resilient and substantially thinner than said side wall and the wall of the tubular body, the diameter of said hollow space being so large that the upper edge of the side wall lies against the udder at such a distance from the teat that it does not exert any pressure on the wall of the udder in the region nearest the teat root, the vertical side wall surrounding said hollow space being substantially thicker than the wall of said tubular body so as to prevent any appreciable compression of the hollow space either axially or radially, to a smaller volume under normal operating conditions.

2. A teat cup liner according to claim 1, in which said top has a ring-shaped flange partly defining the groove and adapted to stretch around said end of the shell, said flange being so thick that the flange is prevented from gliding over said end of the shell when subjected to normal tensile stresses from the tubular body stretched in the shell.

References Cited by the Examiner

UNITED STATES PATENTS

| | | | |
|---|---|---|---|
| 2,744,496 | 5/1956 | Roben | 119—14.47 |
| 2,944,514 | 7/1960 | Nesseth | 119—14.49 |

FOREIGN PATENTS

| | | |
|---|---|---|
| 912,158 | 5/1954 | Germany. |
| 1,063,849 | 8/1959 | Germany. |

SAMUEL KOREN, *Primary Examiner.*

ALDRICH F. MEDBERY, *Examiner.*